United States Patent Office 3,261,877
Patented July 19, 1966

3,261,877
PROCESS FOR PREPARATION OF VERY PURE BENZENE
Klaus Dierschke, Bad Vilbel, Kreis Friedberg, and Adolf Schmalenbach and Emil Sattler, Essen, Germany, assignors, by mesne assignments, to Koppers Company, Inc., Pittsburgh, Pa., a corporation of Delaware
Filed Dec. 26, 1961, Ser. No. 161,889
3 Claims. (Cl. 260—674)

The present invention relates to a process for preparation of very pure benzene having a melting point of 5.4° C. and higher from a mixture of hydrocarbons which contains naphthenic constituents, particularly cyclohexane and methylcyclohexane as well as n-heptane in addition to benzene hydrocarbons.

A number of primary materials are useful as the main source for the recovery of very pure benzene.

A primary main source is the pressure raffinate produced in the so-called pressure refining of the crude light oil from coke plants. This pressure raffinate is a mixture of hydrocarbons which consists for the most part of benzene hydrocarbons and which also contains aliphatic and naphthenic hydrocarbons as impurities. This pressure raffinate is obtained by treating crude benzene (crude light oil) at increased temperature and increased pressure in the presence of a suitable catalyst with a gas containing hydrogen, in the course of which the sulfur, oxygen and nitrogen compounds of the crude light oil are hydrogenated and the accompanying unsaturated hydrocarbons are saturated.

Another primary material for the preparation of very pure benzene is the product produced in reforming plants, for example, refining plants. The reforming process consists of flowing the petroleum fractions together with hydrogen over suitable catalysts, in the course of which the naphthenic compounds are dehydrogenated and the alkylnaphthenes are dealkylated with formation of aromatic hydrocarbons, such as benzene and toluene. However, the reforming does not proceed quantitatively so that the product from the reforming still contains certain proportions of naphthenes, alkyl naphthenes, and other aliphatics.

Finally, another primary material for the preparation of very pure benzene is the so-called "pyrolysis gasoline" which is formed in the thermal and/or catalytic cracking of petroleum hydrocarbons. This "pyrolysis gasoline" which is essentially a mixture of aliphatic and aromatic hydrocarbons contains certain amounts of naphthenic and alkyl naphthenic compounds.

The preparation of very pure benzene from the above-mentioned primary materials is impossible by the customary pure distillation methods if a melting point of 5.4° C. and higher is stipulated for the very pure benzene. This results from the fact that the boiling ranges of the naphthenic, alkyl naphthenic, and aliphatic impurities of the benzene overlap the boiling ranges of the pure aromatics. Furthermore, the benzene and toluene form azeotropes with the various nonaromatic impurities so that it is not possible to exceed a certain degree of purity of the aromatics by the customary distillation methods.

Therefore, it has been suggested to separate the detrimental impurities of the crude benzene by an azeotropic distillation with use of a foreign substance, for example, methyl alcohol, acetone, or the like, or also to extract them by means of an extraction process, for example, an aqueous solution of diethylene glycol, ethylene carbonate or propylene carbonate solution, or the like.

The extraction has acquired a certain technical importance among the last cited processes. However, the apparatus for this process is very expensive and requires high operating costs. This is also true for the azeotropic distillation with use of a foreign substance.

According to an unpublished suggestion, very pure benzene may be recovered solely by distillation methods when the primary material is distilled under increased pressure, for example, a pressure between 2 and 20 atmospheres. In this way it is possible to concentrate the cyclohexane in a benzene-rich head fraction and the n-heptane in a sump or bottom fraction which is low in benzene, so that very pure benzene may be recovered then from the head fraction by a distillation under normal or reduced pressure. In such pressure distillation a maximum benzene yield cannot be achieved since the cyclohexane-containing residual fraction remaining after recovery of the very pure benzene still contains certain amounts of benzene. This is connected with the above-mentioned formation of an azeotrope between cyclohexane and benzene and also with the fact that it is possible to separate this azeotrope in practical operation only under such conditions that additional amounts of benzene appear as impurities of this azeotrope.

The present invention now suggests the following method for recovery of very pure benzene, namely, a benzene having a melting point of 5.4° C. and higher, with a yield of at aleast 90%.

The primary material which contains aromatics, cyclohexane and methylcyclohexane as well as n-heptane, is first decomposed by a distillation at normal or reduced pressure (first distillation) into a head product (benzene forerunnings) consisting essentially of the azeotrope of cyclohexane and benzene as well as additional small amounts of benzene and a sump product containing the aromatics, n-heptane, and methylcyclohexane. The sump product of the first distillation is then separated by a distillation under increased pressure, preferably under a pressure between 2 and 20 atmospheres (second distillation) into a head product consisting of very pure benzene and a sump product containing the higher boiling aromatics as well as n-heptane and methylcyclohexane. Furthermore, the forerunnings of the first distillation are advantageously subjected (reforming) to a catalytic treatment for the purpose of extensive conversion of the aliphatics or naphthenes contained in it into aromatics and then the product from the reforming is added to the starting mixture for the purpose of recovery of the benzene contained in the product from the reforming.

Accordingly, the essence of the invention provides for the functional combination of a separation of the forerunnings and a subsequent pressure distillation of the sump product from the separation of forerunnings with a reforming of the forerunnings to form an additional amount of aromatics. The result consists not only in the recovery of an extremely pure benzene but also in the realization of a high yield, since especially the cyclohexane is converted for the most part into benzene so that under certain circumstances, depending on the selection of the operating conditions, there is obtained a benzene yield which optionally approaches or even slightly exceeds the theoretical yield, calculated on the benzene contained in the starting material.

If the mixture of starting material contains, in addition to the cited aliphatic and naphthenic impurities, higher boiling aromatics, such as toluene, xylenes, "Arsols" (the term applied by the German light oil refining and marketing industry to hydro refined aromatic solvent fractions), and the like, which is usually the case, it is possible to operate the process conforming to the invention in such manner that a very pure toluene fraction can be recovered in addition to a very pure benzene fraction. For this purpose the sump product from the cited second distillation is separated by a normal pressure distillation (third distillation) into a small amount of benzene, also a head product (toluene forerunnings) containing n-heptane and methylcyclohexane and a sump product containing the aromatics boiling higher than benzene. Then a head product consisting of very pure toluene is recovered from the sump product by a distillation under increased pressure (fourth distillation).

In this embodiment of the process of the invention, the yield of aromatics can be additionally increased by subjecting the toluene forerunnings from the third distillation together with the benzene forerunnings from the first distillation to a reforming.

Two embodiments of the process conforming to the invention, which refer to the processing of two different mixtures of primary materials, are schematically illustrated in the drawing.

Figure 1:
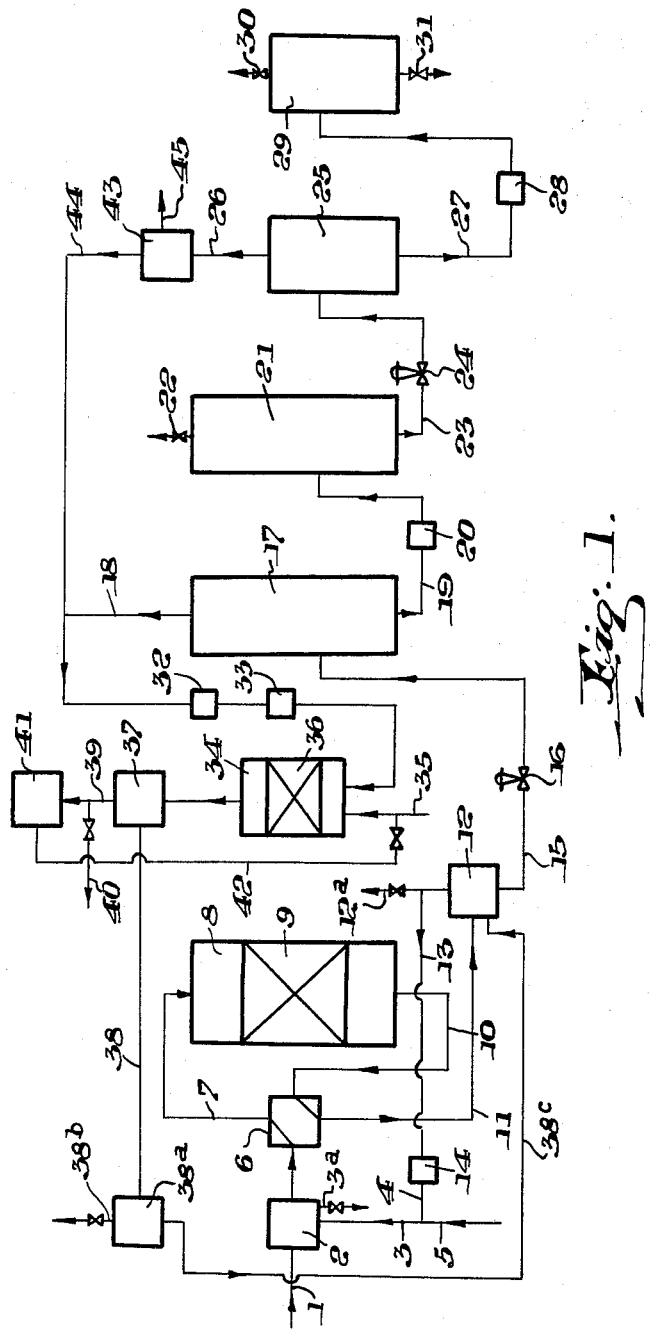
FIGURE 1 illustrates an embodiment of the process conforming to the invention in which coke-plant light oil is used as primary material.

Only the apparatus and equipment, which are essential for operation of the process conforming to the invention, are illustrated in both drawings. For example, practically all heat exchangers, which are important per se for the economy of the process, have been omitted in order not to complicate the drawings unnecessarily. Moreover, the installation of heat exchangers, and the like, is a component of standard distillation technique. Also the recirculation means for the various distillation stages have been omitted for the sake of clarity.

Furthermore, it should be noted that in both drawings the apparatus with the same function have the same reference numerals.

The line for the introduction of the initial mixture is indicated by 1 in FIGURE 1. In the present case this would consist of crude light oil from coke plants, which contains mainly benzene and higher boiling aromatics in addition to aliphatic and naphthenic substances, for example, cyclohexane, methylcyclohexane, n-heptane, and the like, as well as sulfur, oxygen and nitrogen compounds as impurities. The initial mixture is conducted by means of a pressure pump into a vaporizer 2, in which a preheated gas containing hydrogen is simultaneously supplied through line 3. This gas containing hydrogen consists of two components, namely, a recirculated gas which comes from line 4, and a fresh gas continuously replacing the consumed gas, for example, coke oven gas which is introduced through line 5. A thick residue consisting of polymerized, high-boiling constituents remains in the vaporizer 2 and is withdrawn through line 3a.

The mixture of crude benzene vapors and hydrogen gas flows from the vaporizer 2 into a heat exchanger 6, in which this mixture is heated to a peak temperature of 300–380° C. by heat exchange with the hot products of a subsequent treatment of the mixture consisting of crude benzene vapors and hydrogen gas.

This mixture, which prevails under a pressure between 30 and 50 atmospheres flows through line 7 into a so-called pressure refining oven 8 in which a catalyst bed 9 is located. The unsaturated hydrocarbons contained in the crude benzene are hydrogenated to saturated hydrocarbons in the catalyst bed. Moreover, the impurities containing sulfur, oxygen, and nitrogen present in the crude benzene are hydrogenated to such extent that the sulfur compounds are converted to hydrogen sulfide, the oxygen compounds to steam, and the nitrogen compounds to elemental nitrogen.

Particularly suitable catalysts for these hydrogenation reactions are the sulfides and oxides of the metals from the 5th, 6th and 8th groups of the periodic system of elements, if desired on carriers, such as active alumina.

The reaction mixture treated in this manner flows through line 10 into heat exchanger 6 and from there through line 11 into a condenser 12, in which the benzene hydrocarbons are liquefied; the latter then form the so-called pressure raffinate. The uncondensed hydrogen gas is again recycled through line 13, and a small compresser 14 is intermediately connected for compensation of the resultant pressure loss. A small portion of this recycle gas is continuously withdrawn through line 12a in order to remove from the process the hydrogenation products formed from the sulfur, oxygen, and nitrogen compounds.

The pressure raffinate from condenser 12, after it has been freed from dissolved $H_2S$ by a suitable treatment, flows through line 15 through an expansion valve 16 into distillation column 17. This distillation column operates under normal pressure, if desired, under a reduced pressure down to about 400 mm. mercury column. The operating conditions are regulated in distillation column 17 so that a mixture of vapor, containing the main amount of the cyclohexane (about 90%) contained in the starting material in azeotrope with benzene as well as additional amounts of benzene (benzene forerunnings) among other compounds, escapes through line 18. The total amount of benzene forerunnings withdrawn through line 18, calculated on the starting material, amounts to about 3–5%.

The sump product from distillation column 17 flows through line 19 by means of a pressure pump 20 into distillation column 21 which is under an increased pressure amounting to between 2 and 20 atmospheres. The pressure to be regulated in this column depends on the composition of the mixture which is to be separated there. It has been shown that the most favorable results in regard to separation and economy can be achieved in the case of coke-plant light oils of customary composition with a pressure between 5 and 10 atmospheres.

A very pure benzene is distilled off in distillation column 21, and it is withdrawn through line 22. The additional steps for the recovery of very pure benzene (cooling, condensation, expansion) are not illustrated here.

The sump product from the pressure distillation, which contains the higher boiling aromatics, as well as n-heptane, methylcyclohexane and small amounts of benzene, goes through line 23 by way of expansion valve 24 into another normal pressure distillation column 25. In this column there is produced a head fraction which leaves through line 26 and which consists essentially of n-heptane and other aliphatics, methylcyclohexane and small amounts of benzene toluene (toluene forerunnings).

The sump fraction from distillation column 25, which contains practically only toluene, xylenes, and "Arsols" (the term applied by the German light oil refining and marketing industry to hydro refined aromatic solvent fractions), pass through line 27 by means of a pressure pump 28 into another pressure distillation column 29. This column also prevails under a pressure between 2 and 20 atmospheres. A pressure of about 3.5 atmospheres has been proven especially favorable for standard coke-plant light oil. The head product from column 29, which is withdrawn through line 30, consists of very pure toluene, while the sump product which is withdrawn through line 31 contains essentially the xylenes, "Arsols," and some high boiling alkylnaphthenes.

The benzene forerunnings separated in column 17 flows through line 18 into a condenser 32 and from there through the pressure pump 33 into the reforming apparatus 34. A gas containing hydrogen is simultaneously flowed through line 35 into the reforming apparatus. A dehydrogenation of the cyclohexane is achieved in the reforming apparatus with the aid of catalyst 36, while the benzene contained in the forerunnings remains unchanged. The product from the reforming flows into condenser 37 in which the hydrocarbons which now consist for the most part of benzene are condensed. These hydrocarbons are then added through line 38c to the pressure raffinate in the cooler 12 after the nonaromatic constituents have been previously separated in a stabilization apparatus 38a. Said nonaromatic constituents are removed from the process through line 38b. The hydrogen gas not condensed in condenser 37 is withdrawn through lines 39 and 40 and can then be used for any optional purpose. For example, the hydrogen gas from line 40 can be combined with the hydrogen gas in line 5, and it is thus available for the pressure refining. If desired, it is also possible to flow a portion of the hydrogen gas from line 5 first through the reforming apparatus and from there back into line 5. This is possible since the reforming process is connected with the production of new hydrogen.

The reforming process is known per se. If a gas which still contains sulfur compounds, particularly hydrogen sulfide, is used as the hydrogen gas, a cobalt-molybdenum catalyst must be used for the reforming since such a catalyst is not only resistant to sulfur but even continuously requires a certain treatment with sulfur. The use of such a hydrogen gas containing hydrogen sulfide would be advantageous in itself because of the possibility of using a normal coke oven gas for this purpose. However, a certain disadvantage consists in that the reforming temperatures are comparatively high upon using cobalt-molybdenum catalysts, for example, 575–650° C., so that it is necessary to use for the reforming apparatus steels which are resistant to hydrogen sulfide. If a hydrogen gas which is free from sulfur is available, a platinum catalyst can be advantageously used for the reforming, since it is then possible to operate at essentially lower reforming temperatures, for example 450–500° C., and thus the installation of steels which are resistant to hydrogen sulfide is not indicated. The use of pure hydrogen gas for the reforming does not result in any operating difficulty in the present case, if coke oven gas is used for the suggested pressure refining of benzene. When the reforming apparatus 34 is first placed in operation, as much pure hydrogen must be used as is necessary for a single filling of the apparatus with hydrogen. The dehydrogenation effect of the catalyst in the reforming process produces additional amounts of pure hydrogen, a sufficient amount of which is stored in tank 41 corresponding to that required when the reforming apparatus is replaced in operation after a standstill. This amount of hydrogen can then be removed from the supply tank 41 through line 42 and introduced into line 35. The excess amounts of hydrogen are discharged through line 40 in the described manner.

The head product of the distillation column 25, the so-called toluene forerunnings (if it is not desired to introduce all of it to the motor fuel section), can be distributed as desired in a special separating apparatus 43 so that a mixture of benzene, residual n-heptane and other relatively low boiling aliphatics is withdrawn through line 44, while the n-heptane, methylcyclohexane and the other higher boiling hydrocarbons contained in the intermediate fraction are removed through line 45 and may then be mixed, for example, with the motor fuel. However, it is also possible to combine all the forerunnings from line 44 with the product from line 18 and to subject the mixture to a reforming in order to increase the yields of very pure benzene and toluene in this way.

In another embodiment of the invention, the parts referring to the multistage standard pressure-increased pressure distillation are unchanged. When the product from a reforming of petroleum fractions is charged, a pressure refining apparatus is superfluous, so that the flow diagram conforming to FIGURE 2 results.

Figure 2:
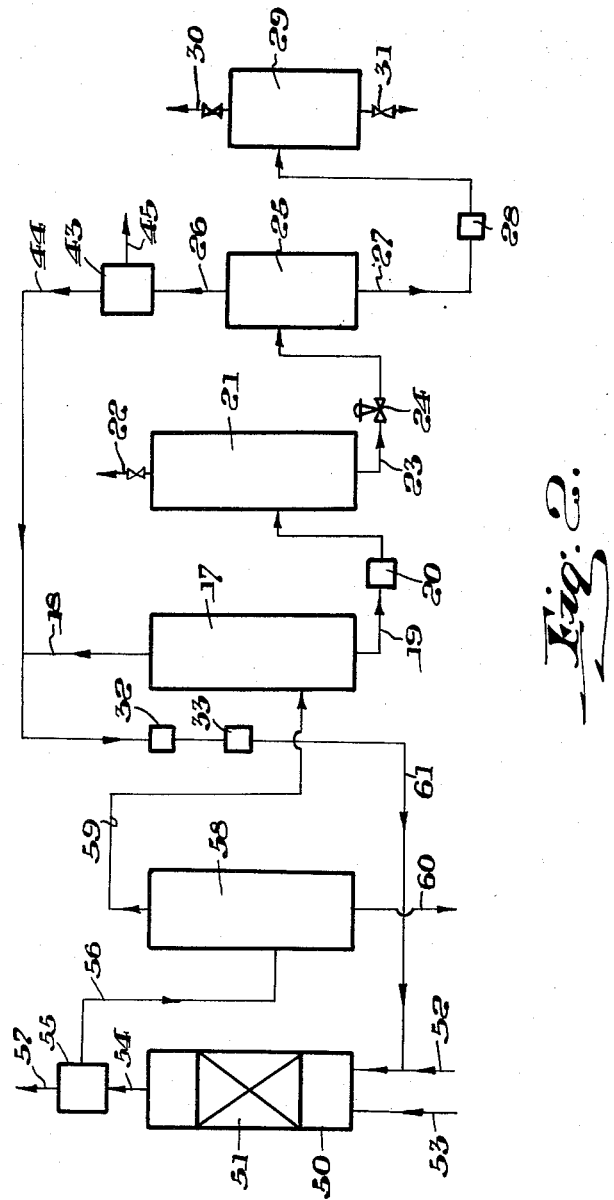
FIGURE 2 illustrates an embodiment of the process conforming to the invention, in which the product from reforming of petroleum fractions is used as a mixture of primary materials.

In FIGURE 2 the apparatus for reforming of petroleum fractions is indicated by 50. The apparatus is provided with a catalyst 51, the details of which are explained in connection with the reforming apparatus 34 of FIGURE 1. The petroleum fraction is introduced through line 52 and the hydrogen gas is added through line 53. The mixture of vapor leaves the reforming apparatus 50 through line 54 and goes into a condenser 55, from which the condensible hydrocarbons are withdrawn through line 56, while the hydrogen gas is removed through line 57. The product from the reforming then goes from line 56 into a distillation column 58 from which a fraction rich in benzene is withdrawn at the top through line 59, while the aliphatics and higher homologs of benzene contained in the reforming product are removed from the bottom of column 58.

Upon charging a petroleum fraction with mostly aliphatic constituents having a boiling range of 100–180° C., the portion of benzene fraction withdrawn through line 59 amounts to about 7–15% of the charged petroleum fraction; whereas when a naphthenic fraction with a boiling range of 100–150° C. is charged, the benzene fraction amounts to about 60% of the starting material.

The benzene fraction passes through line 59 into the forerunnings column 17 and is then subsequently treated in the same manner as described in connection with FIGURE 1. However, a special reforming apparatus as is referred to in FIGURE 1 by 34 is not necessary in this case, since the forerunnings from column 17 together with the fraction separated from apparatus 43 are introduced into reforming apparatus 50 through line 61 and are processed there to aromatics.

Another embodiment of the invention, which is not specifically illustrated in a figure, relates to the use of the so-called "pyrolysis gasoline" which is formed by thermal and/or catalytic cracking of petroleum fractions. This pyrolysis gasoline is a mixture of hydrocarbons which contains considerable portions of aromatic hydrocarbons. Such a starting product would be introduced into the forerunnings column 17, if desired with intermediate connection of a predistillation or a prerefining, and it would then be additionally processed in the above-described manner. In this case also, as described in connection with FIGURE 1, a small separate reforming apparatus is provided for the processing of the forerunnings from column 17 and the product from apparatus 43.

*Example*

The invention is explained in more detail in a numerical example for the operating method of FIGURE 1.

In a unit of time 1050 kg. of a typical crude coke plant benzene (crude light oil) are supplied through line 1 to the apparatus which is diagrammatically illustrated in FIGURE 1. This mixture of crude benzene is vaporized in vaporizer 2 in the presence of about 1350 normal cubic meters of gas containing hydrogen. This gas containing hydrogen consists of 1200 standard cubic meters of recycled gas from line 4 and 150 normal cubic meters of fresh coke oven gas from line 5. A thick residue in an amount of about 30 kg. accumulates in the vaporization of the crude benzene and it is continuously withdrawn through line 3a. After complete refining and subsequent condensation of the refined crude benzene, about 1000 kg. of pressure raffinate is collected in condenser 12. This raffinate contains, among other compounds, 660 kg. of benzene, 168 kg. of toluene, 76 kg. of xylene, 65.3 kg. of "Arsols" and higher boiling compounds as well as the cited aliphatic and naphthenic impurities; about 20 kg. of gaseous and vaporous materials in the form of hydrogen sulfide, steam and nitrogen are simultaneously withdrawn through line 12a.

The pressure raffinate together with the product from the reforming (46.5 kg.) from line 38c flow through line 15 into the distillation column 17 in which it is separated into the following two fractions:

Head product (benzene forerunnings): 40 kg. consisting of—
  21 kg. of forerunnings
  3 kg. of cyclohexane
  16 kg. of benzene
Sump product: 1006.5 kg. consisting of—
  678.5 kg. benzene
  173.8 kg. toluene
  76.0 kg. xylene
  65.3 kg. higher boiling (for example, "Arsols") compounds
  12.96 kg. toluene forerunnings, including 2.16 kg. n-heptane The sump product is then subjected to a pressure distillation in column 21. A very pure benzene having a melting point above 5.4° C. is produced as head product in an amount of 662.5 kg. Calculated on the benzene contained in the pressure raffinate (660 kg.), this signifies a yield of 100.35%.

The sump product from the pressure distillation column 21 accumulates in an amount of 344.06 kg. and contains 16.0 kg. benzene in addition to toluene, the xylenes and higher boiling compounds as well as all of the n-heptane. This product is again distilled in column 25 at atmospheric pressure and is separated into the following two fractions:

Head product (toluene forerunnings): 27.56 kg. consisting of—
  5.4 kg. forerunnings
  2.16 kg. n-heptane
  16.0 kg. benzene
  4.0 kg. toluene
Sump product: 316.5 kg. consisting of—
  175.2 kg. toluene
  141.3 kg. xylenes and higher boiling compounds The sump product from column 25 is then subjected to another pressure distillation in column 29 and is separated into the following fractions:

Head product:
  171.2 kg. pure toluene with a boiling range of 0.01° C.
Sump product: 145.3 kg. consisting of—
  40 kg. of toluene
  105.3 kg. of xylenes and higher boiling compounds The yield of pure toluene, calculated on the toluene (168.0 kg.) contained in the pressure raffinate, amounts to about 102%.

The benzene forerunnings (40 kg.) from column 17 and the toluene forerunnings (27.56 kg.) from column 27 are combined (67.56 kg.) and introduced to the reforming apparatus 34. After the reforming the mixture contains the following components:

|  | Kg. |
|---|---|
| Benzene | 34.5 |
| Toluene | 5.8 |
| Cyclohexane | 0.5 |
| n-Heptane | 0.36 |
| Other hydrocarbons | 26.4 |
| Total | 67.56 |

21.0 kg. of low boiling, mainly aliphatic and naphthenic or alkylated naphthenic hydrocarbons are separated from the reformed product in the stabilizing column 38a and are discharged through line 38b. There remain 46.56 kg. stabilized reformed product which is combined by line 38c in cooling tank 12 with the pressure raffinate; the total amount is 1046.56 kg.

In this numerical example the main units are operated under the following temperatures and pressures:

| Unit (in Fig. 1) | Temperature, °C. | Pressure absolute, kg./cm.² |
|---|---|---|
| Hydrofining (8): | | |
| Entrance | 370 | 42 |
| Outlet | 410 | |
| Distillation (17): | | |
| Top | 77 | 11 |
| Bottom | 90 | |
| Distillation (21): | | |
| Top | 140 | 5 |
| Bottom | 180 | |
| Distillation (25): | | |
| Top | 90 | 1 |
| Bottom | 120 | |
| Distillation (29): | | |
| Top | 175 | 5 |
| Bottom | 220 | |
| Reforming (34) | 550 | 48 |

It is claimed:
1. Process for preparation of very pure benzene with a melting point of 5.4° C. and higher from a starting mixture of hydrocarbons which contains naphthenic constituents, particularly cyclohexane and methylcyclohexane, as well as n-heptane in addition to the benzene hydrocarbons, said process comprising:
  separating the starting mixture by a first distillation at normal pressure into a first head product consisting essentially of an azeotrope of cyclohexane and benzene as well as additional small amounts of benzene and into a first sump product containing the main amount of benzene as well as the higher boiling aromatics and n-heptane and methylcyclohexane;
  separating said first sump product by a distillation under a superatmospheric pressure of between 2 and 20 atmospheres into a second head product consisting of pure benzene and a second sump product containing higher boiling aromatics as well as n-heptane and methylcyclohexane;
  subjecting said first head product to a catalytic reforming treatment for the purpose of substantial conversion of the aliphatics and naphthenes contained in it into aromatics to obtain a reformed product; and
  adding the reformed product to additional starting mixture for recovery of the benzene contained therein.

2. The process as defined in claim 1, in which said second sump product is separated by a third distillation at normal pressure into a third head product containing a small amount of benzene, as well as n-heptane and methylcyclohexane and into a third sump product containing aromatic compounds boiling higher than benzene; and said third sump product is separated by a fourth distillation under increased pressure into a fourth head product consisting of very pure toluene.

3. The process as claimed in claim 2, in which the third head product together with the first head product are subjected to a reforming process.

References Cited by the Examiner

UNITED STATES PATENTS

| 2,653,175 | 9/1953 | Davis | 260—674 X |
| 2,939,891 | 6/1960 | Sattler | 260—674 |
| 3,009,002 | 11/1961 | Kron | 260—666 X |
| 3,054,727 | 9/1962 | Von Kessel et al. | 260—674 X |

DELBERT E. GANTZ, *Primary Examiner.*

ALPHONSO D. SULLIVAN, *Examiner.*

C. E. SPRESSER, *Assistant Examiner.*